US006582188B2

(12) United States Patent
Rippl

(10) Patent No.: US 6,582,188 B2
(45) Date of Patent: Jun. 24, 2003

(54) TURBOCHARGER

(75) Inventor: Alexander Rippl, Augsburg (DE)

(73) Assignee: MAN B&W Diesel Aktiengesellschaft, Augsburg (DE)

(*) Notice: Subject to any disclaimer, the term of this patent is extended or adjusted under 35 U.S.C. 154(b) by 0 days.

(21) Appl. No.: 09/766,713

(22) Filed: Jan. 22, 2001

(65) Prior Publication Data

US 2001/0016161 A1 Aug. 23, 2001

(30) Foreign Application Priority Data

Jan. 21, 2000 (DE) .......................... 100 02 581

(51) Int. Cl.⁷ ................................ F02B 37/00
(52) U.S. Cl. ...................... 415/116; 415/119
(58) Field of Search ............... 415/208.1, 119, 415/116

(56) References Cited

U.S. PATENT DOCUMENTS

| | | | |
|---|---|---|---|
| 4,689,960 A | * | 9/1987 | Schroder et al. ........... 60/607 |
| 4,743,161 A | * | 5/1988 | Fisher et al. ............. 415/116 |
| 5,218,822 A | * | 6/1993 | Legg ..................... 415/116 |
| 6,052,897 A | | 4/2000 | Greber ................... 29/889.2 |

FOREIGN PATENT DOCUMENTS

| | | |
|---|---|---|
| DE | 196 40 647 A1 | 4/1998 |
| EP | 309 044 B1 | 3/1989 |
| JP | 0055057622 AA | 4/1980 |

* cited by examiner

Primary Examiner—Edward K. Look
Assistant Examiner—Kimya N McCoy
(74) Attorney, Agent, or Firm—Cohen, Pontani, Lieberman & Pavane

(57) ABSTRACT

A turbocharger for a gas operated internal combustion engine in which air and gas are fed to the compressor through gas passage openings provided in an air intake connection of the compressor. A simple and compact arrangement for introducing the gas and the air is thereby provided. Optionally, an insert body is arranged at a hub of the impeller, for increasing acceleration of gas flow.

6 Claims, 2 Drawing Sheets

TURBOCHARGER

BACKGROUND OF THE INVENTION

1. Field of the Invention

The present invention relates to a turbocharger for a gas operated internal combustion engine in which air and gas are fed to the compressor.

2. Description of the Related Art

In the known arrangements of this type, the gas is fed to the air upstream of the turbocharger. To this end, a venturi tube is connected in-line between a silencer and the compressor. Holes are provided in the narrowest cross section of this venturi tube. The gas flows into the venturi tube through these holes. The flow is accelerated in the venturi tube and a vacuum is thus created for gas admixing.

A disadvantage of this is that a relatively long line has to be provided between the silencer and the compressor. A further disadvantage is that the air in the venturi tube is first accelerated and subsequently decelerated again in order to then be accelerated again at the outlet of the compressor wheel. This leads to pressure losses upstream of the compressor. As a result, the air mass flow rate and the charge pressure decrease.

SUMMARY OF THE INVENTION

The object of the invention is to provide a simple arrangement of compact construction for introducing gas into the air in a turbocharger.

According to the present invention, this object is achieved by an arrangement including gas passage openings being provided in an air intake connection of a compressor.

While dispensing with a venturi tube, an existing component can be used for the gas feed, a factor which results in a simple and compact arrangement. In this case, the accelerating flow of the air upstream of the entry to the compressor impeller is advantageously utilized for drawing and admixing the gas. Compared with the known arrangement, this results in lower pressure losses upstream of the compressor, and gives rise to a higher charge pressure and a greater air mass flow rate. In addition, depending on the position of the gas passage openings, a higher vacuum can be achieved for the gas admixing. A silencer is provided in the intake path of the air. The silencer may be fastened directly to the housing of the compressor.

In a particularly preferred embodiment, the gas passage openings are arranged in the region of the smallest diameter of the air intake connection.

An annular collecting space intended for the gas is provided on the outside with an inlet connection. Preferably, the annular collecting space is formed between the air intake connection and the outflow housing of the compressor. In this arrangement, a supporting wall, which is generally present anyway, for the outflow duct of the compressor, may be used for forming the collecting space. Therefore, no additional components are required for providing the collecting space.

In a further embodiment of the invention, the gas passage openings between the air intake connection and the collecting space are arranged so as to be uniformly distributed over the circumference of the air intake connection. This results in uniform mixing of the gas with the air.

A silencer is expediently connected directly to the air intake connection of the compressor. This promotes the compact construction of the arrangement.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, in which like reference characters denotes similar elements through the several views, the present invention is shown in schematic form.

DETAILED DESCRIPTION OF THE PRESENTLY PREFERRED EMBODIMENTS

The present invention applies to engines provided with an exhaust gas turbocharger for supercharging an air/gas mixture. Engines of this type are in use, for example, as generator drives which can be operated with sewage gas.

Figure 1:
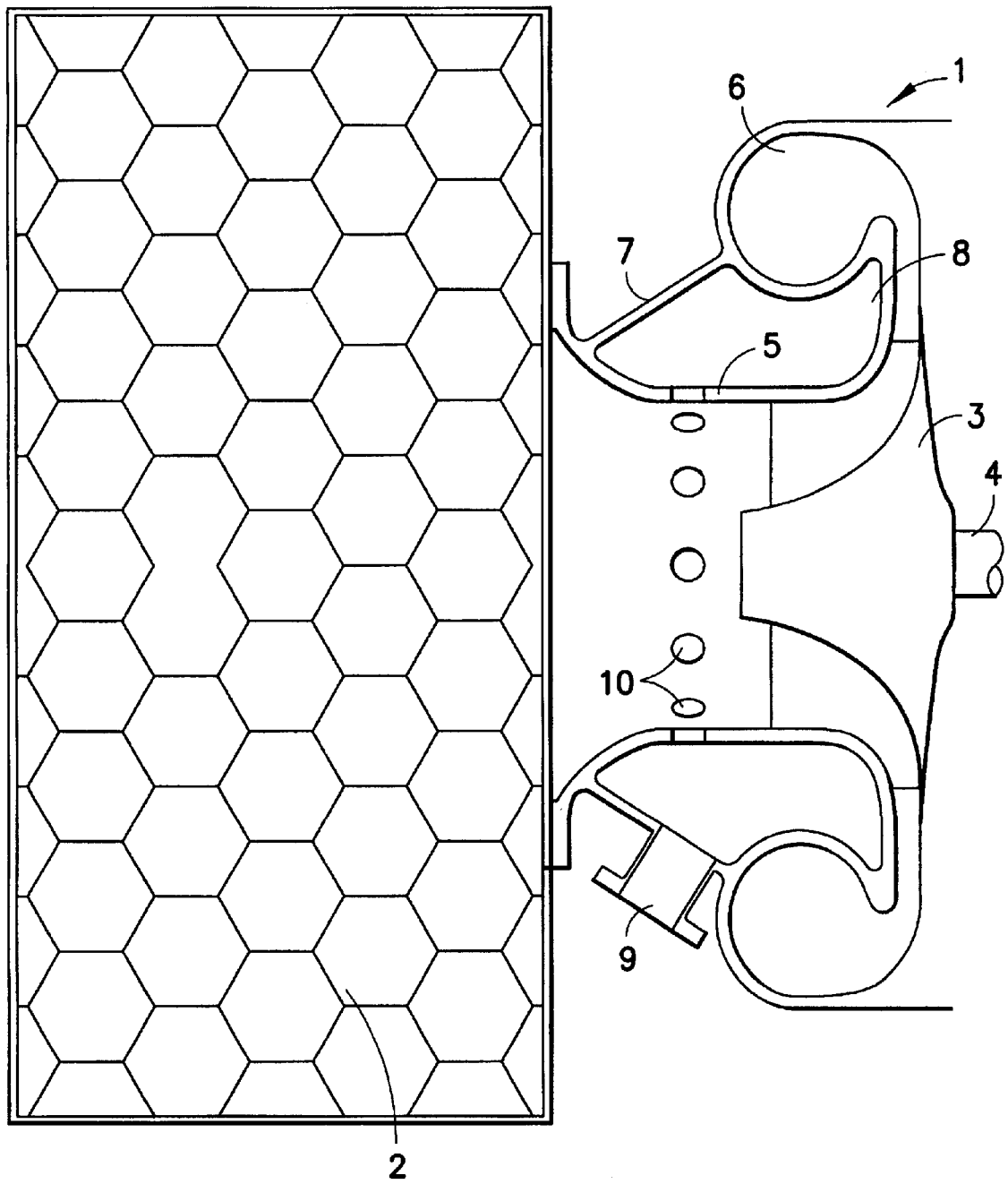
FIG. 1 is a partly sectioned side view of an embodiment of the present invention.

FIG. 1 shows a compressor, designated generally as 1, of an exhaust gas turbocharger of an appropriate engine. A silencer 2 through which air is drawn into a region of the compressor 1 is attached to the compressor 1. The gas is drawn directly in a region of the compressor 1 in a manner explained in more detail below.

The compressor 1 has an impeller 3, which is driven via a shaft 4 by a turbine impeller (not shown) of the exhaust gas turbocharger. An air intake connection 5 is provided on the inlet side of the impeller 3. The silencer 2 can be flange-mounted directly on an air inlet side of the air intake connection 5. On the other side, the air intake connection 5 merges into an annular outflow housing 6.

The air intake connection 5 and the outflow housing 6 are additionally connected to one another via an annular supporting wall 7. As a result, an annular collecting space 8 surrounding the air intake connection 5 is formed. The collecting space 8 is provided with an inlet connection 9, which is to be connected to a gas source, e.g., a tank to which gas can be admitted. Gas passage openings 10 are provided in the air intake connection 5. The openings connect the collecting space 8 to the space inside the air intake connection 5 upstream of the compressor impeller 3.

The gas passage openings 10 are located in a region of the air intake connection 5 having a free cross-sectional area that is smaller than the cross-sectional area at the outlet of the silencer 2. Preferably, the gas passage openings 10 are located in the region of the smallest diameter of the air intake connection 5. In order to obtain thorough intermixing of the gas with the air, the gas passage openings 10 are arranged so as to be uniformly distributed over the circumference of the air intake connection. A simple configuration of the gas passage openings 10 is in the form of holes.

In an embodiment of the present invention, the gas passage openings are inclined relative to the radial direction, so that they run at an angle to an axis of the air intake connection 5. This configuration assists the intake action.

During operation, gas is directed into the air intake connection 5 due to a pressure difference between the higher pressure of the gas in the collecting space 8 and the lower pressure of the air supplied through the air intake connection 5. The pressure is reduced in the air intake connection 5 due to the acceleration of air there.

Figure 2:
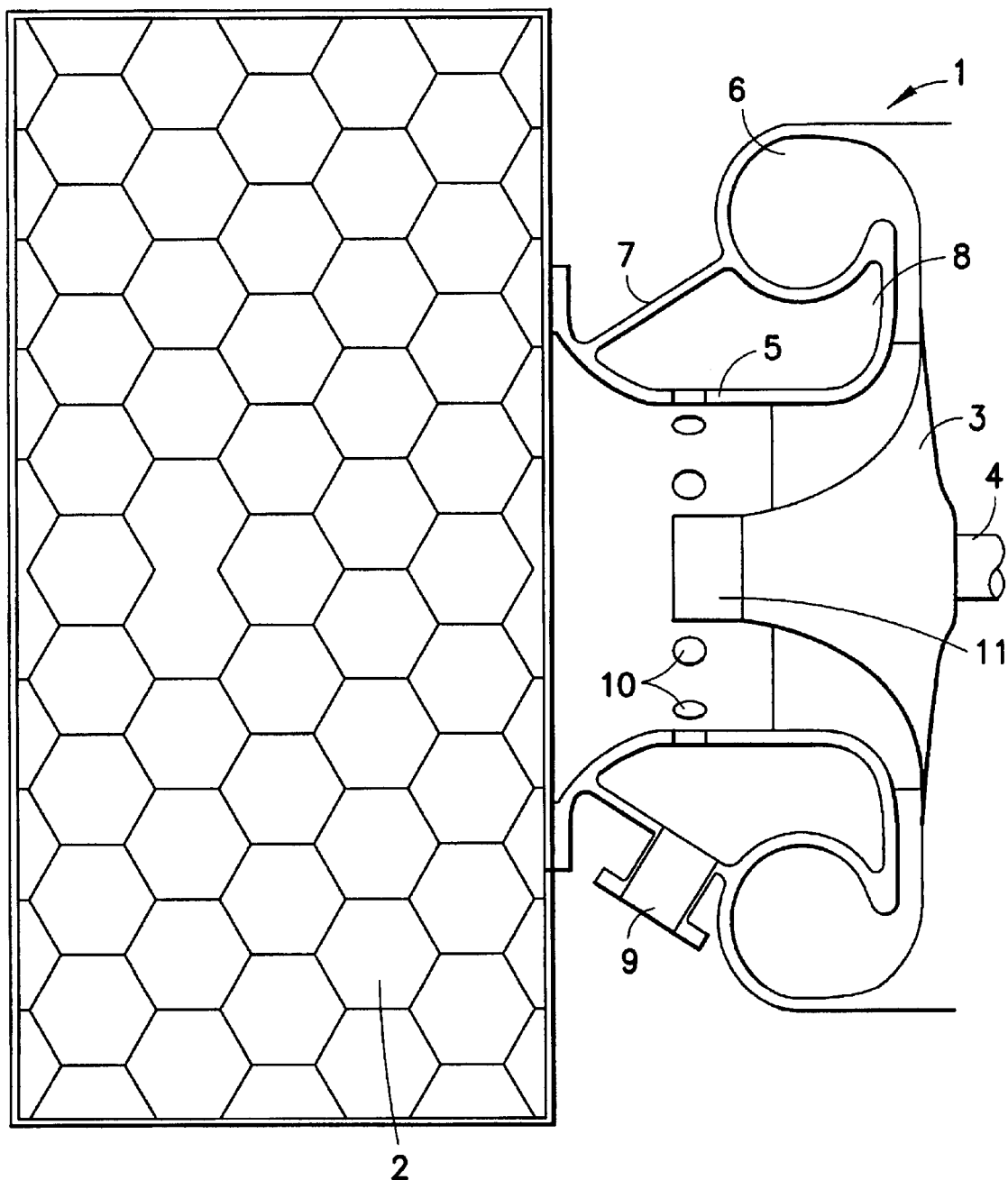
FIG. 2 is a partly-sectioned side view of an alternative embodiment of the present invention.

Referring now to FIG. 2, the reduction in the pressure in the air intake connection 5 may be assisted by an insert body 11 arranged in front of a hub of the impeller 3 of the compressor 1 which serves to accelerate the air flow. In this case, it is preferred to arrange the gas passage openings 10 in the region of the insert body 11.

The invention can be used in all gas operated supercharged internal combustion engines, such as compression ignition gas engines or spark ignition gas engines.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A turbocharger for a gas operated internal combustion engine, comprising:

a compressor with an impeller and a drive shaft, the impeller having an inlet side and an outlet side;

an air intake connection arranged on the inlet side of the impeller, the air intake connection being configured to define a radially interior space and having a plurality of gas passage openings uniformly distributed over a circumference of the air intake connection; and a compressor housing arranged about the impeller and the air intake connection, the housing including an annular supporting wall and an annular outflow housing which together define an annular collecting space situated between the air intake connection and the outflow housing, the annular collecting space including an inlet connection distinct from the impeller inlet for allowing gaseous fuel to be introduced into the annular collecting space, the plurality of gas passage openings connecting the annular collecting space with the radially interior space of the air intake connection.

2. The turbocharger according to claim 1, wherein the air intake connection has a tapered diameter including a small diameter region and a large diameter region, wherein the gas passage openings are arranged toward the small diameter region of the air intake connection.

3. The turbocharger according to claim 1, wherein the gas passage openings are arranged in the air intake connection in a direction of air flow into the connection.

4. The turbocharger according to claim 1, wherein the gas passage openings are inclined at an angle to an axis of the air intake connection.

5. The turbocharger according to claim 1, wherein the impeller includes a hub at the inlet side, the turbocharger further comprising:

an insert body arranged in front of the hub of the impeller, in an air flow direction, so as to accelerate the air flow.

6. A turbocharger for a gas operated internal combustion engine, comprising:

a compressor with an impeller and a drive shaft, the impeller having an inlet side and an outlet side, the impeller including a hub at the inlet side;

an air intake connection arranged on the inlet side of the impeller having a plurality of gas passage openings; and an insert body arranged in front of the hub of the impeller, in an air flow direction, so as to accelerate the air flow, the gas passage openings being arranged in a region of the air intake connection proximate of the insert body.

* * * * *